United States Patent
Van Berkel et al.

(10) Patent No.: US 7,702,706 B2
(45) Date of Patent: Apr. 20, 2010

(54) CONFIGURABLE MULTI-STEP LINEAR FEEDBACK SHIFT REGISTER

(75) Inventors: Cornelis Hermanus Van Berkel, Eindhoven (NL); Ricky Johannes Maria Nas, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 1120 days.

(21) Appl. No.: 10/552,048

(22) PCT Filed: Mar. 30, 2004

(86) PCT No.: PCT/IB2004/050362

§ 371 (c)(1),
(2), (4) Date: Oct. 4, 2005

(87) PCT Pub. No.: WO2004/090714

PCT Pub. Date: Oct. 21, 2004

(65) Prior Publication Data

US 2006/0269037 A1 Nov. 30, 2006

(30) Foreign Application Priority Data

Apr. 8, 2003 (EP) .................. 03100935

(51) Int. Cl.
*G06F 7/58* (2006.01)
(52) U.S. Cl. .................. 708/252; 377/64
(58) Field of Classification Search .......... 708/252
See application file for complete search history.

(56) References Cited

U.S. PATENT DOCUMENTS

| | | | | |
|---|---|---|---|---|
| 4,847,861 A * | 7/1989 | Hamatsu et al. | ............ | 375/142 |
| 5,412,665 A | 5/1995 | Gruodis et al. | | |
| 5,987,056 A * | 11/1999 | Banister | .................. | 375/130 |
| 6,173,009 B1 * | 1/2001 | Gu | .............. | 375/150 |
| 6,594,680 B1 * | 7/2003 | Gu et al. | .................. | 708/256 |
| 6,640,236 B1 * | 10/2003 | Lupin et al. | ............... | 708/250 |

* cited by examiner

*Primary Examiner*—Lewis A Bullock, Jr.
*Assistant Examiner*—Michael Yaary

(57) ABSTRACT

The state transition of a linear feedback shift register (LFSR) controlled by a clock (310) with length N and step size W, W being at least two, is accomplished via a next-state function (320). The next-state function deploys a state transition matrix (350). The state vector (330), which represents the contents of the LFSR, is either multiplied sequentially by the state transition matrix or multiplied by the state transition matrix to the power of W (multiple state transition matrix). The method and the LFSR according to the invention are characterized in that the multiple state transition matrix is decomposed in a first matrix (360) and a second matrix (370), the first matrix comprising at most N+W+1 different expressions and the second matrix comprising at most N+W+1 different expressions. The LFSR further comprises means to multiply the state vector by the second matrix and the first matrix, and means for computing the first matrix. The invention overcomes the shortcomings of configurable multi-step linear feedback shift registers because the amount of time needed to generate the output can be reduced significantly.

7 Claims, 6 Drawing Sheets

CONFIGURABLE MULTI-STEP LINEAR FEEDBACK SHIFT REGISTER

The invention relates to a method for accomplishing state transitions in a configurable linear feedback shift register (LFSR) controlled by a clock, the length of the LFSR being represented by N, wherein a state vector represents the state of the LFSR, an output of the LFSR comprising W output symbols, W being at least two, and the output symbols being generated during one clock cycle, a state transition of the LFSR being accomplished during one clock cycle via multiplication of the state vector by a state transition matrix to the power of W (multiple state transition matrix).

The invention also relates to a configurable linear feedback shift register (LFSR) controlled by a clock, the length of the LFSR being represented by N, a state vector representing the state of the LFSR, the LFSR being arranged to generate an output comprising W output symbols, W being at least two, to generate the output symbols during one clock cycle, the LFSR comprising multiplication means for accomplishing a state transition of the LFSR during one clock cycle via multiplication of the state vector by a state transition matrix to the power of W (multiple state transition matrix).

Linear feedback shift registers have a large number of applications. A common example is known from the area of third generation (3G) wireless communication, in particular mobile phones based on code division multiple access (CDMA) standards and base stations using CDMA. Other applications are error protection and error correction in communication or storage systems, cryptography in communication or storage systems, built-in self test (BIST) of memory systems or very large scale integrated (VLSI) circuits and global positioning systems (GPS).

In general terms, an LFSR is a particular kind of data register which is controlled by a clock. The LFSR is characterized by a feedback loop which determines the contents of the LFSR during a state transition. The behavior of an LFSR, in particular the sequence of symbols that is stored after each clock cycle, can be modeled mathematically. In this context a symbol represents data, for example a bit or another numerical value.

The mathematical model comprises a state vector to represent the sequence of symbols and a state transition matrix to accomplish the state transition. The number of stored symbols is referred to as the length of the LFSR. A new sequence of symbols is generated via multiplication of the state vector by a state transition matrix, thus providing the new contents of the LFSR. The state transition is accomplished during one clock cycle. Also, output is generated during a clock cycle. If a single symbol is generated as output during a clock cycle, the LFSR is identified as a single-step LFSR; if at least two symbols are generated as output during a clock cycle, the LFSR is identified as a multi-step LFSR. A multi-step linear feedback shift register with length N symbols and step size W symbols is referred to as an N/W-LFSR. For example, if a symbol represents a bit then a processor may comprise a 32/16-LFSR, which has a length of 32 bits and a step size of 16 bits.

A configurable LFSR is an LFSR which can be programmed and reprogrammed with configuration symbols. The configuration symbols determine the state transition of the LFSR. Usually they are a constituent of the state transition matrix. For example, in cryptography applications the configuration symbols can represent the coding information for computing the new contents of the LFSR during a clock cycle. The number of configuration symbols is equal to the length of the LFSR. The state transition matrix comprises the configuration symbols, so that the new contents of the LFSR during each clock cycle are determined by the configuration of the LFSR. In the mathematical model of the LFSR, the configuration symbols are represented by a generator polynomial. The configuration of the LFSR is not the same as the initialization of the LFSR; initialization can be done by storing an initial sequence of symbols in the LFSR.

According to the state of the art, state transitions of multi-step linear feedback shift registers can be accomplished via multiplication of a state vector by a state transition matrix W times, wherein W represents the step size of the LFSR and the step size is defined as the number of output symbols generated during a clock cycle. If the state transition matrix is represented by F, then a W-step LFSR requires multiplication of the state vector by F, W times. The circuit architecture needed to implement this LFSR comprises a stack of W AND/XOR slices, wherein an AND slice comprises a plurality of AND gates and an XOR slice comprises a plurality of XOR gates. During a clock cycle the state vector, which represents the contents of the LFSR, must be multiplied W times by the state transition matrix. As a consequence, the time needed to accomplish the state transition of the LFSR grows in proportion to W. The multiplication of the state vector by the state transition matrix W times results in a long clock cycle time, causing a problem for several applications.

Instead of multiplying the state vector by the state transition matrix W times, the state vector can be multiplied by the state transition matrix to the power of W. If the state transition matrix is represented by F, then a W-step LFSR requires multiplication of the state vector by $F^W$. This approach leads to an acceptable clock cycle time, but the amount of additional AND/XOR gates needed to compute $F^W$ is relatively high. The additional hardware is required to evaluate the large number of complex expressions in $F^W$. The state transition matrix to the power of W is also referred to as the multiple state transition matrix.

It is an object of the invention to provide a method of the kind set forth which simplifies the multiplication of the state vector by the multiple state transition matrix. In order to achieve said object the method is characterized by the characterizing part of claim 1.

It is another object of the invention to provide a linear feedback shift register (LFSR) of the kind set forth which provides multiplication means for the multiplication of the state vector by the second matrix and the first matrix, and which provides means to compute the first matrix during a configuration stage of the operation of the LFSR. In order to achieve said object the LFSR is characterized by the characterizing part of claim 3.

In a multi-step LFSR which is controlled by a clock at least two output symbols are generated during one clock cycle. In order to ensure an acceptable clock cycle time a state vector, representing the sequence of symbols that is stored in the LFSR, must be multiplied by a state transition matrix raised to the power of W, wherein W represents the step size of the LFSR. For example, if the step size is equal to 5 then the state vector must be multiplied by the state transition matrix to the power of 5. Because $F^5$ contains many complex expressions the computation of $F^5$ requires a large amount of additional AND/XOR gates.

The method according to the invention simplifies the state transition of a multi-step LFSR by decomposing the multiple state transition matrix into two matrices which accomplish the same state transition. The amount of additional hardware, in particular the amount of additional AND/XOR gates, is significantly less for the simplified state transition.

The embodiment defined in claim 2 is favorable in an LFSR wherein the configuration symbols are not updated very frequently. The elements of the first matrix can be computed when the LFSR is being configured and the configuration symbols are given. This may occur on a regular basis, for example once after every X clock cycles. X can be a relatively large number such as 1000. Because the computation of the elements of the first matrix only has to be repeated every X clock cycles and the expressions in the first matrix are relatively simple, computation hereof is not within the critical path of computation. If this is the case there is an additional advantage; the clock cycle time may be reduced making use of the characteristics of the first matrix.

The embodiment defined in claim 1 is a particularly advantageous decomposition of the multiple state transition matrix, providing an exact specification of the elements of the first matrix and the second matrix.

The LFSR according to claim 3 reflects the decomposition of the multiple state transition matrix.

An embodiment defined in claim 4 comprises a first set of logical units for multiplication of the state vector by the second matrix and a second set of logical units for multiplication of the state vector by the first matrix.

A further embodiment defined in claim 5 comprises a third set of logical units for computation of the first matrix.

The embodiment defined in claim 6 is favorable if the LFSR is configured on a regular basis, but not too frequently. The computation of the first matrix, in particular the evaluation of the expressions in the first matrix, is not performed during each clock cycle. If the interval for configuration of the LFSR is chosen properly, the computation of the first matrix is done outside the critical path of computation because the expressions in the first matrix are relatively simple and they are not evaluated frequently.

The embodiment defined in claim 7 provides an extension of the LFSR which is favorable if a delayed sequence should be generated.

The invention overcomes the shortcomings of configurable multi-step linear feedback shift registers because the amount of time needed to generate the output can be reduced significantly. This is achieved by minimizing the clock cycle time while the amount of additional hardware required to compute the next state of the LFSR is relatively low.

It is noted that a multi-step linear feedback shift register is known from U.S. Pat. No. 5,412,665. This multi-step LFSR has length N bits and a variable step size W bits, under the condition that W is smaller than or equal to N (W≦N). The circuit architecture needed to implement this particular LFSR comprises a stack of W AND/XOR slices. This document does not disclose or suggest to decompose the multiple state transition matrix in a first and a second matrix according to the present invention.

The present invention is described in more detail with reference to the drawings, in which.

Figure 1:
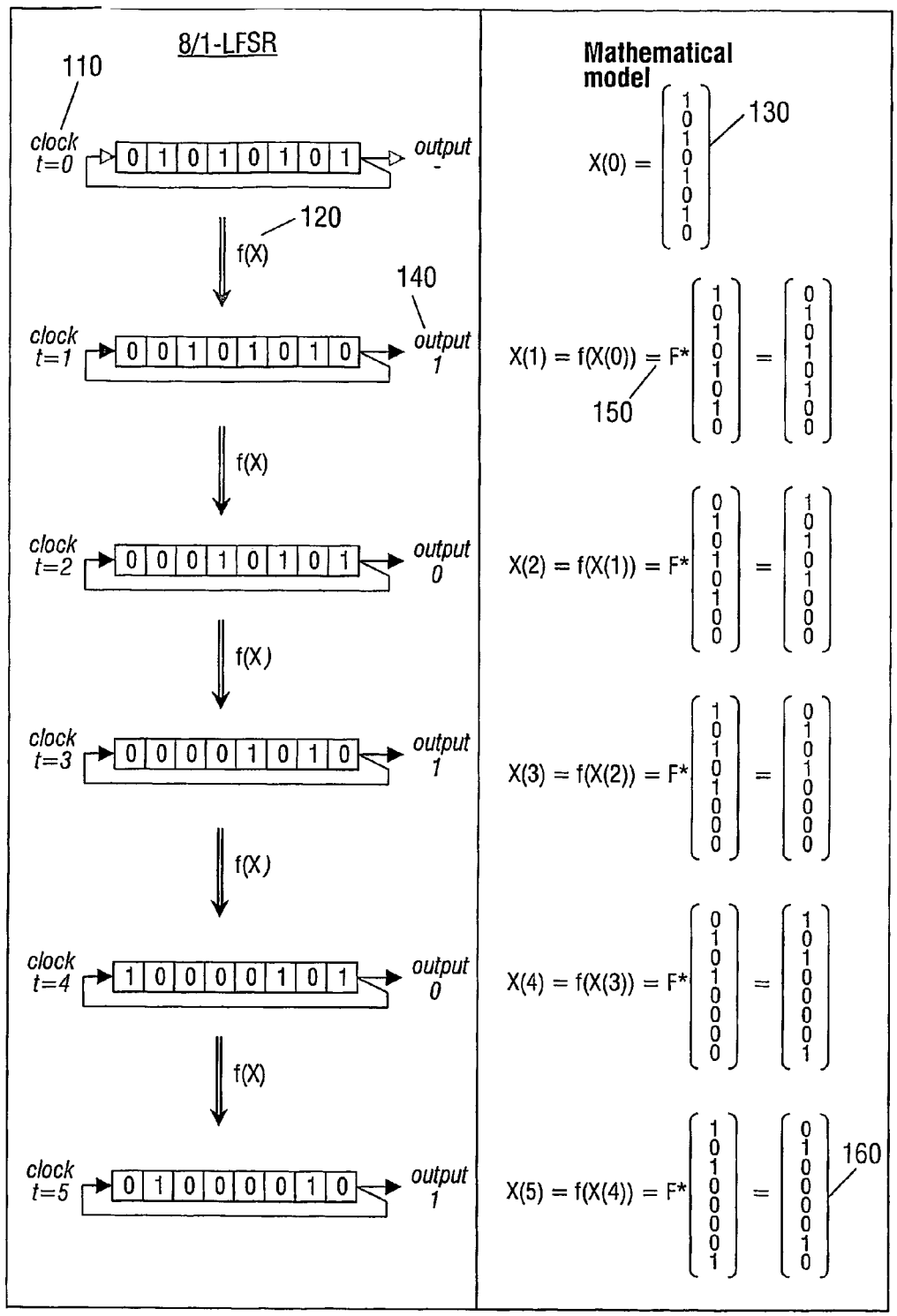
FIG. 1 illustrates an 8/1-LFSR and its mathematical model according to the state of the art.

FIG. 1 illustrates an 8/1-LFSR and its mathematical model. A clock 110 controls the LFSR and during each clock cycle the variable t is incremented by 1. Initially variable t has value '0', after one clock cycle t has value '1', after two clock cycles t has value '2' etc. A next-state function 120 accomplishes the state transition of the LFSR during a clock cycle and a state vector 130 represents the contents of the LFSR in the mathematical model. The output 140 during a clock cycle comprises one bit; the LFSR is a single-step LFSR. At t=5, i.e. after five clock cycles, five output bits have been generated. The state vector 160 after five clock cycles represents the LFSR at t=5. A state transition is accomplished during a clock cycle via the next-state function 120, in particular via multiplication of the state vector 130 by a state transition matrix 150. During each clock cycle exactly one multiplication of the state vector by the state transition matrix is performed.

The state transition matrix F has the following form:

$$F = \begin{bmatrix} & 1 & & & & \\ & & 1 & & & \\ & & & \ldots & & \\ & & & & 1 & \\ & & & & & 1 \\ g_0 & g_1 & g_2 & \ldots & g_{N-2} & g_{N-1} \end{bmatrix}$$

The variable N represents the length of the LFSR and the variables $g_0, g_1$ up to and including $g_{N-1}$, also referred to as the expressions of the state transition matrix, represent the configuration bits of the LFSR. In this case the configuration symbols represent bits. The empty values in the matrix must be read as value '0'. The number of configuration bits is equal to the length of the LFSR, so the next-state function of an 8/1-LFSR deploys the following state transition matrix F:

$$F = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ g_0 & g_1 & g_2 & g_3 & g_4 & g_5 & g_6 & g_7 \end{bmatrix}$$

As an example, the configuration bits have been given the values $g_0=1, g_1=0, g_2=1, g_3=1, g_4=0, g_5=1, g_6=0$ and $g_7=0$. So the state transition matrix F used in the examples of FIG. 1, FIG. 2 and FIG. 3 is:

$$F = \begin{bmatrix} 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 1 & 0 & 1 & 1 & 0 & 1 & 0 & 0 \end{bmatrix}$$

Figure 2:
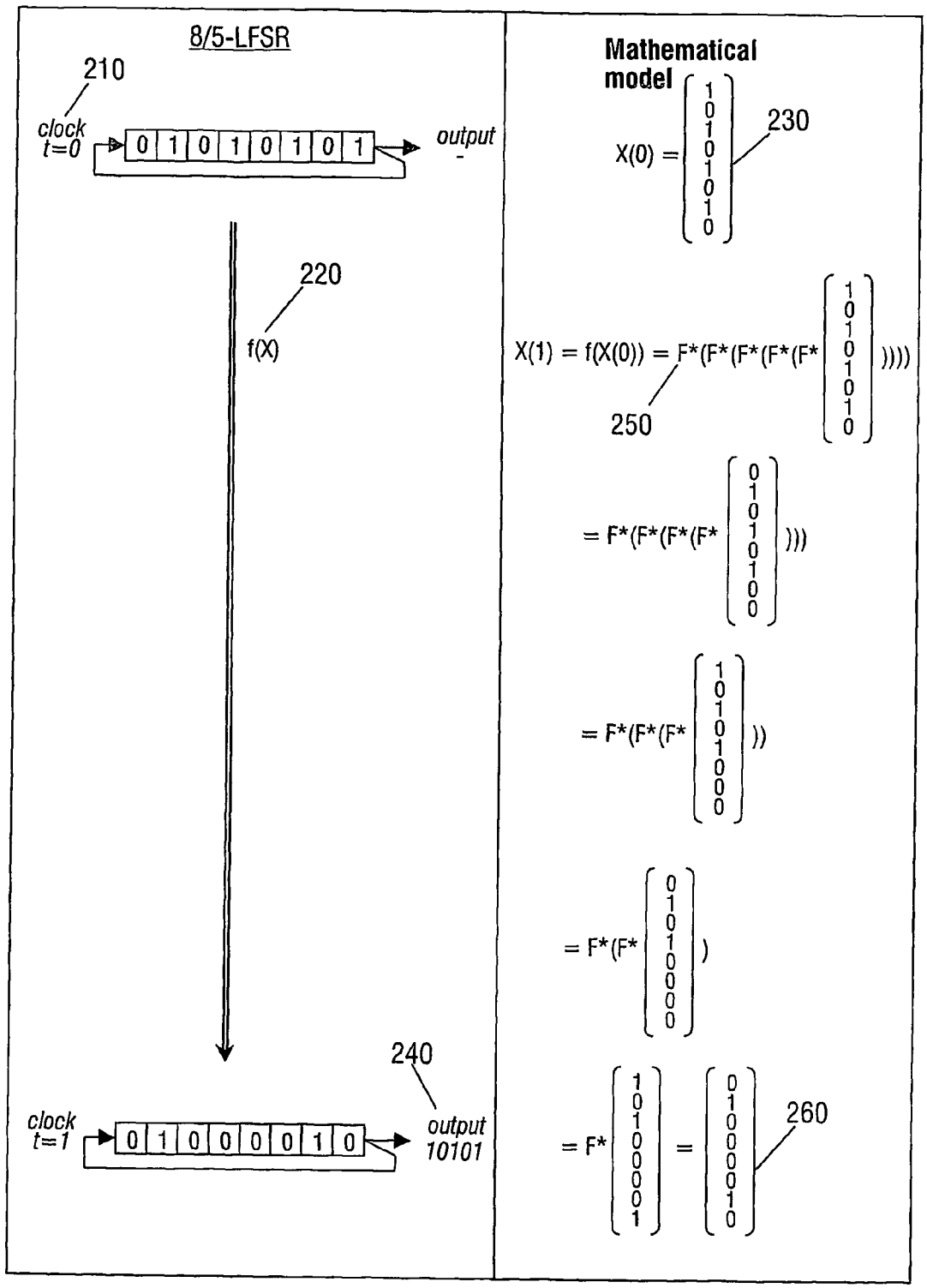
FIG. 2 illustrates an 8/5-LFSR and its mathematical model according to the state of the art.
Figure 3:
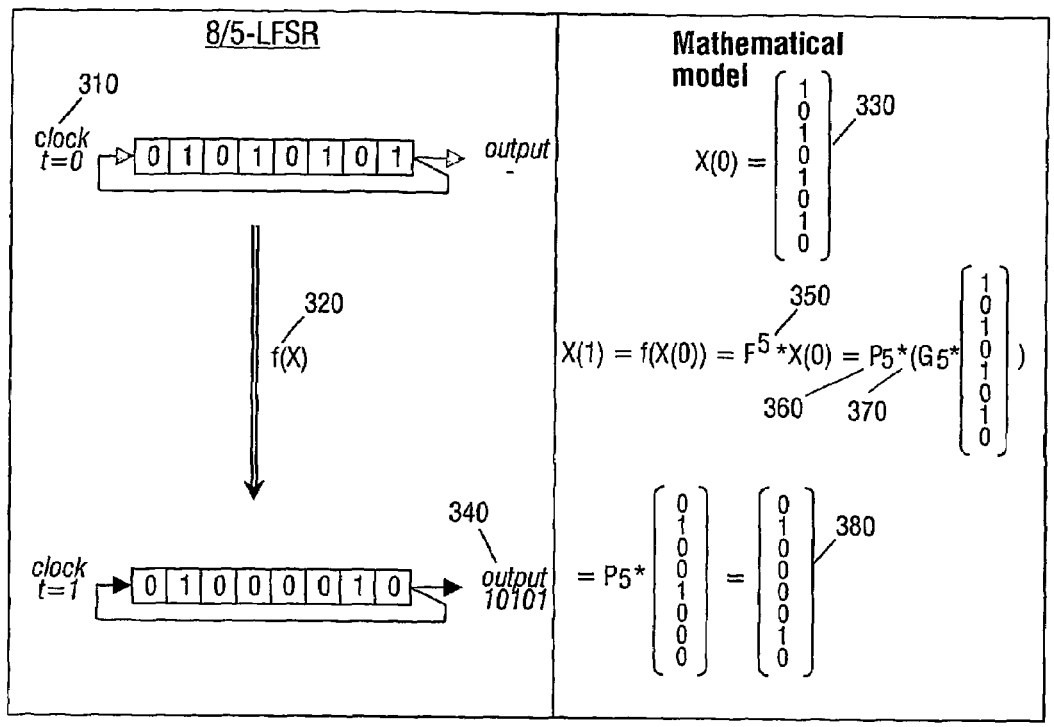
FIG. 3 illustrates an 8/5-LFSR and its mathematical model according to the invention.

FIG. 2 illustrates an 8/5-LFSR and its mathematical model. Again, a clock 210 controls the LFSR and during each clock cycle the variable t is incremented by 1. Initially variable t has value '0' and after one clock cycle t has value '1'. A next-state function 220 accomplishes the state transition of the LFSR during a clock cycle and a state vector 230 represents the contents of the LFSR in the mathematical model. The output 240 during a clock cycle comprises five bits; the LFSR is a five-step LFSR. At t=1, i.e. after one clock cycle, five output bits have been generated. The state vector 260 after one clock cycle represents the LFSR at t=1. A state transition is accomplished during a clock cycle via the next-state function 220. However, the next-state function must now deploy the state transition matrix 150 five times to accomplish the state transition of the LFSR. The state vector is multiplied five times by the state transition matrix 250. This approach requires additional hardware compared to a single-step LFSR and the clock cycle time increases significantly.

Alternatively, the state transition matrix 250 is raised to the power 5 and then the state vector is multiplied by $F^5$ (not shown). This approach leads to an acceptable clock cycle time, but the amount of additional hardware required to evaluate the expressions in $F^5$ is relatively high.

FIG. 3 illustrates an 8/5-LFSR according to the invention. A clock 310 controls the LFSR and during each clock cycle the variable t is incremented by 1. Initially variable t has value '0' and after one clock cycle t has value '1'. A next-state function 320 accomplishes the state transition of the LFSR during a clock cycle and a state vector 330 represents the contents of the LFSR in the mathematical model. The output 340 during a clock cycle comprises five bits; the LFSR is a five-step LFSR. At t=1, i.e. after one clock cycle, five output bits have been generated. The state vector 380 after one clock cycle represents the LFSR at t=1. Again, a state transition is accomplished during a clock cycle via the next-state function. However, the next-state function 320 uses a different approach. The involution of the state transition matrix 350, followed by the multiplication of the state vector 330 by the state transition matrix 350 to the power of 5, is replaced by a less complex method, specifically by multiplication of the state vector 330 by a first matrix 360 and a second matrix 370. The first matrix 360 comprises at most 14 different expressions, since N+W+1=8+5+1=14. The second matrix 370 also comprises at most 14 different expressions, since N+W+1=8+5+1=14.

The state transition matrix F is raised to the power of 5, resulting in $F^5$. The matrix $F^5$ is decomposed into $P_5*G_5$, wherein $P_5$ is the first matrix 360 and $G_5$ is the second matrix 370. In these examples the first matrix 360 and the second matrix 370 respectively have the following forms:

$$P_5 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & p_0 \\ 0 & 0 & 0 & 0 & 0 & 0 & p_0 & p_1 \\ 0 & 0 & 0 & 0 & 0 & p_0 & p_1 & p_2 \\ 0 & 0 & 0 & 0 & p_0 & p_1 & p_2 & p_3 \\ 0 & 0 & 0 & p_0 & p_1 & p_2 & p_3 & p_4 \end{bmatrix}$$

-continued $$G_5 = \begin{bmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & g_0 & g_1 & g_2 & g_3 \\ 0 & 0 & 0 & g_0 & g_1 & g_2 & g_3 & g_4 \\ 0 & 0 & g_0 & g_1 & g_2 & g_3 & g_4 & g_5 \\ 0 & g_0 & g_1 & g_2 & g_3 & g_4 & g_5 & g_6 \\ g_0 & g_1 & g_2 & g_3 & g_4 & g_5 & g_6 & g_7 \end{bmatrix}$$

In this embodiment the first matrix $P_5$ comprises 5 different expressions ($p_0$, $p_1$ up to and including $p_4$) and the second matrix $G_5$ comprises 8 different expressions ($g_0$, $g_1$ up to and including $g_7$). The expressions in $G_5$ do not need to be evaluated, since their values are already given. The expressions in $P_5$ need to be evaluated, but their complexity is relatively low compared to the complexity of the expressions in $F^5$. In order to illustrate the difference in complexity of the expressions, the expressions in $P_5$ and the expressions in the fourth column of $F^5$ are given as an example. The expressions $p_i$ in $P_5$ are worked out as follows if the symbols represent bits:

$p_0=1$ $p_1=g_7$ $p_2=g_6+g_7$ $p_3=g_5+g_7$ $p_4=g_4+g_6+g_6g_7+g_7$

The expressions in the fourth column of the matrix $F^5$ are worked out as follows:

$$F^5[4] = \begin{pmatrix} 0 \\ 0 \\ 0 \\ g_4 \\ g_3 + g_4g_7 \\ g_2 + g_4g_6 + g_3g_7 + g_4g_7 \\ g_1 + g_4g_5 + g_3g_6 + g_2g_7 + g_3g_7 + g_4g_7 \\ g_0 + g_4 + g_3g_5 + g_2g_6 + g_4g_6 + \\ g_1g_7 + g_2g_7 + g_3g_7 + g_4g_7 + g_4g_6g_7 \end{pmatrix}$$

Likewise, the remaining columns of $F^5$ have five expressions which are mutually different and which are different from the expressions in other columns. The total number of different expressions in $F^5$ equals 40, which clearly exceeds the maximum number of 14 different expressions according to the present invention. Furthermore, the remaining columns of $F^5$ have expressions of similar complexity, so the overall complexity of $F^5$ is significantly higher than the complexity of $P_5$. The expressions $g_0$, $g_1$ up to and including $g_7$ are simple expressions which represent the configuration bits of the LFSR and the expressions $p_0$, $p_1$ up to and including $p_4$ have calculated values, dependent on the simple expressions $g_0$, $g_1$ up to and including $g_7$.

For an N/W-LFSR the elements of the second matrix 370 are defined by $$G_{i,j} = \begin{cases} 1, & \text{if } i - j = W \\ g_{i+j-N+1}, & \text{if } (i + j \geq N - 1) \wedge (j \geq N - W) \\ 0, & \text{otherwise} \end{cases}$$

and the elements of the first matrix 360 are defined by $$P_{i,j} = \begin{cases} 1, & \text{if } i = j \wedge i < N - W \\ p_{i+j-2N+W+1}, & \text{if } i + j \geq 2N - W - 1) \\ 0, & \text{otherwise} \end{cases}$$

wherein $$p_0 = 1 \text{ and } p_1 = \sum_{j=0}^{i-1} g_{N-i+j} p_j \text{ for } 0 < i < N.$$

Using the above-mentioned formula to compute the elements of the matrices, the first matrix 360 and second matrix 370 are:

$$P_5 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 1 \\ 0 & 0 & 0 & 1 & 0 & 0 & 1 & 0 \end{bmatrix}$$

$$G_5 = \begin{bmatrix} 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 1 & 1 \\ 0 & 0 & 0 & 1 & 0 & 1 & 1 & 0 \\ 0 & 0 & 1 & 0 & 1 & 1 & 0 & 1 \\ 0 & 1 & 0 & 1 & 1 & 0 & 1 & 0 \\ 1 & 0 & 1 & 1 & 0 & 1 & 0 & 0 \end{bmatrix}$$

Said matrices $F^5$, $P_5$ and $G_5$ are used in the computations performed in the example of FIG. 3. In this case N equals 8 and W equals 5. The invention applies to the embodiments of an LFSR with variable length and variable step size. Variable N represents the length of the LFSR and variable W represents the step size of the LFSR.

Figure 4:
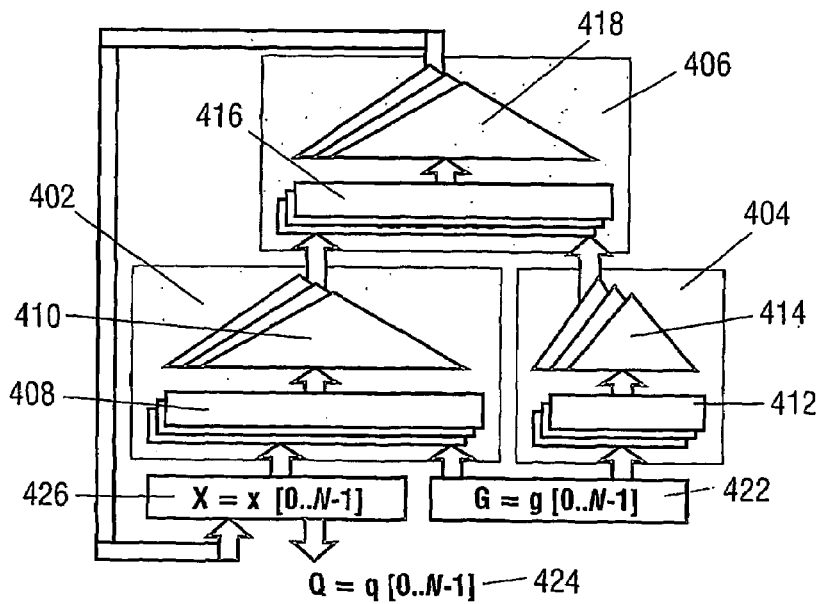
FIG. 4 illustrates a circuit architecture for a N/W-LFSR according to the invention.

FIG. 4 illustrates a circuit architecture of an N/W-LFSR according to the invention. The logical units comprise AND slices and XOR slices. An AND slice comprises a plurality of AND gates and an XOR slice comprises a plurality of XOR gates. Taken together, the AND/XOR slices are able to perform the multiplication and addition operations needed for the vector by matrix multiplication. Three sets of logical units are distinguished:

a first set 402 of AND slices 408 and XOR slices 410;

a second set 406 of AND slices 416 and XOR slices 418;

a third set 404 of AND slices 412 and XOR slices 414.

The generator polynomial 422 represents the configuration bits of the LFSR in the mathematical model. The elements of the generator polynomial are used as simple expressions in the state transition matrix 350 and they are a constituent of the expressions $p_1$ of the first matrix 360. The contents of the LFSR are represented by the state vector 426 and during a clock cycle the state vector is multiplied by the second matrix 370, whereupon the intermediate vector is multiplied by the first matrix 360. During a clock cycle output bits 424 are generated and the amount of output bits is equal to the step size W of the LFSR.

The multiplication of the state vector 426 by the second matrix 370 is performed by the first set 402 of AND slices 408 and XOR slices 410. The multiplication of the resulting intermediate vector by the first matrix 360 is performed by the second set 406 of AND slices 416 and XOR slices 418. The third set 404 of AND slices 412 and XOR slices 414 is deployed to compute the first matrix 360, in particular to evaluate the expressions $p_i$ in the first matrix.

The embodiments set forth apply to an LFSR, which comprises an output stream and a feedback loop to update the contents of the LFSR. This kind of LFSR is usually deployed in a generator, for example a Pseudo Random Noise (PRN) generator. The only source of input is the feedback loop and the feedback loop comprises a next-state function on the output. The LFSR set forth has a symbolic form 510.

Figure 5:
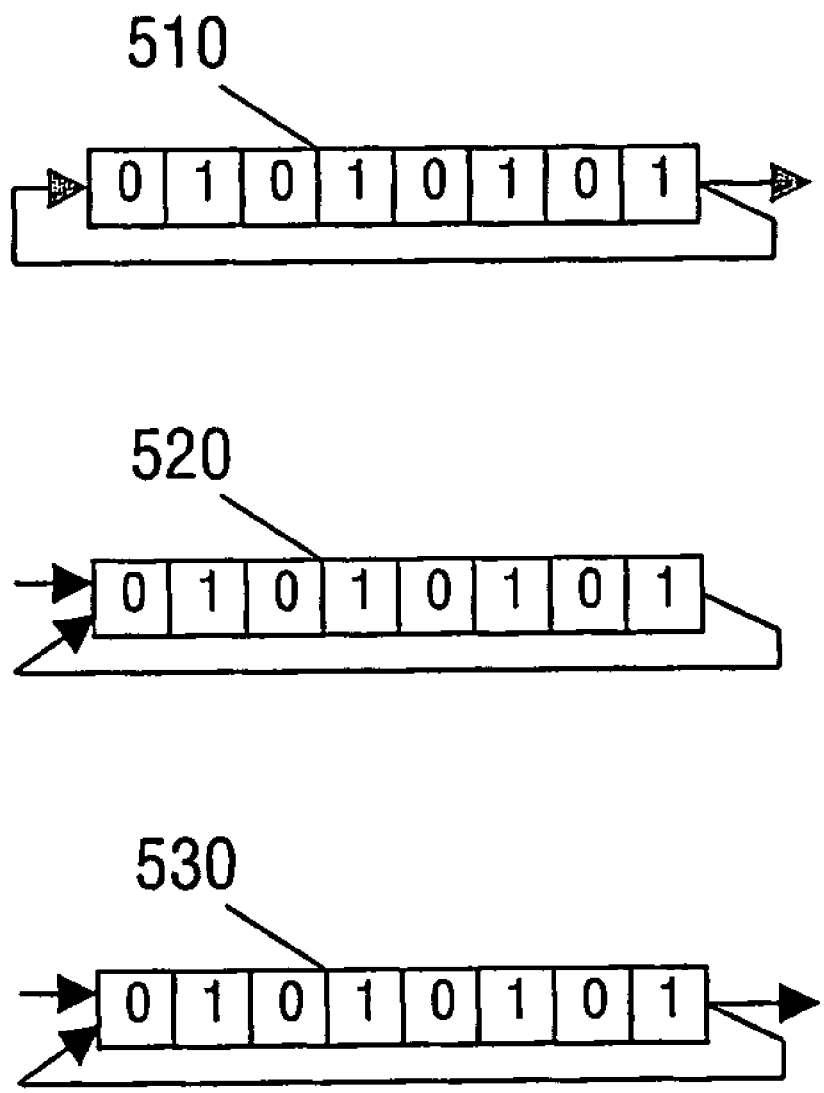
FIG. 5 illustrates a number of variants of an 8/5-LFSR.

There are two important variations of this LFSR, as shown in FIG. 5. The method set forth can also be applied in these variations. The first variation is usually deployed in cyclic redundancy check (CRC) applications or in signature analysis for built-in self test (BIST) of hardware. It has an input stream and a feedback loop to update the contents of the LFSR, but it does not have an output stream. The first variation has a symbolic form 520. The second variation is usually deployed in cryptography applications. It has an input stream, an output stream and a feedback loop to update the contents of the LFSR in combination with the input. The feedback loop is used to encrypt the input stream; the output stream is the encrypted input stream. The second variation has a symbolic form 530.

Figure 6:
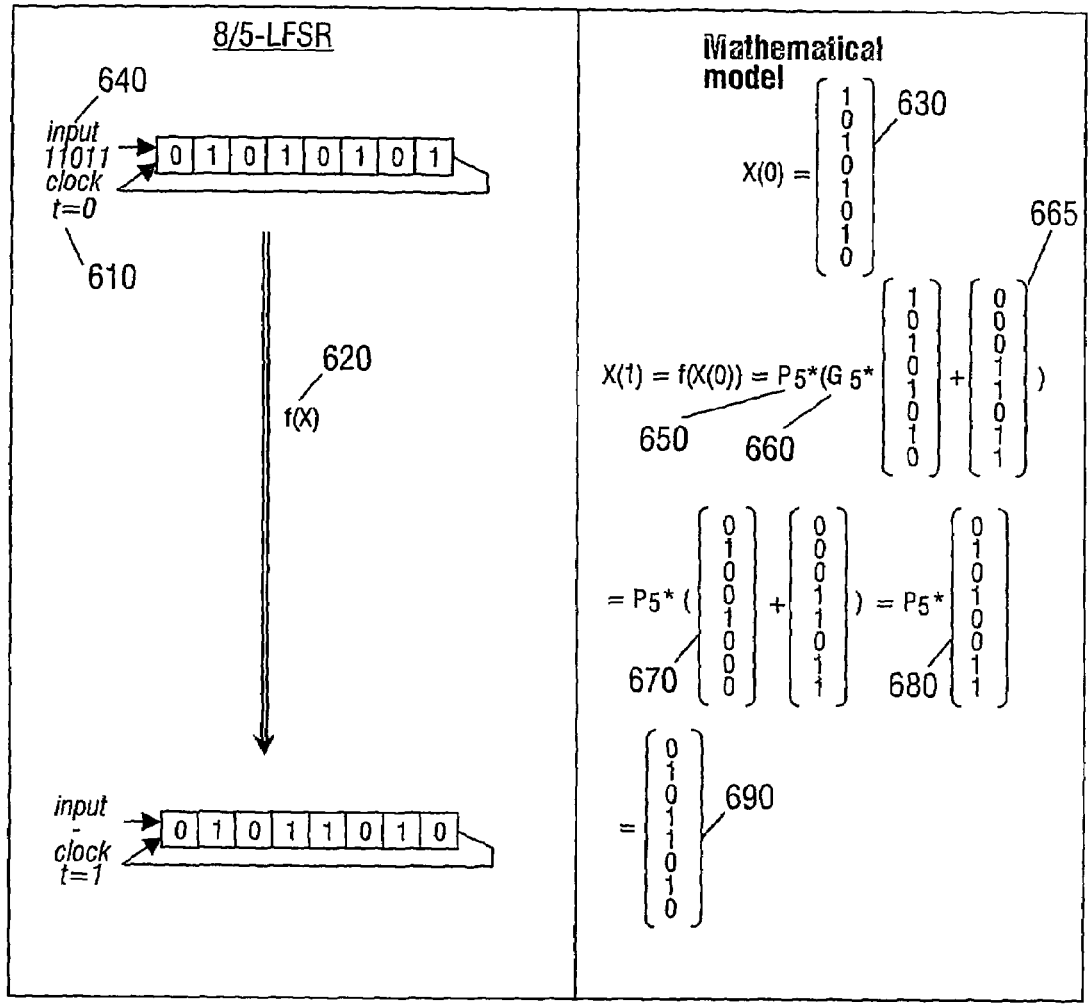
FIG. 6 illustrates a variant of an 8/5-LFSR and its mathematical model according to the invention.

The first variation 520 requires a slightly different computation of the state transition, since an input stream must be taken into account. This is illustrated in FIG. 6. Again, a clock 610 controls the LFSR and during each clock cycle the variable t is incremented by 1. Initially variable t has value '0' and after one clock cycle t has value '1'. A next-state function 620 accomplishes the state transition of the LFSR during a clock cycle and a state vector 630 represents the contents of the LFSR in the mathematical model. The LFSR is a five-step LFSR because it consumes five input bits, but it does not produce an output. The input 640 during a clock cycle comprises five bits. The state vector 690 represents the contents of the LFSR at t=1. The multiple state transition matrix is decomposed into a first matrix 650 and a second matrix 660. Next, the state vector 630 is multiplied by the second matrix 660. Then an input vector 665 is added to a first intermediate vector 670; the lower five values of the input vector correspond to the five input bits. Finally a second intermediate vector 680 is multiplied by the first matrix 650. A similar approach for computation of the state transition can be used for the second variation 530 (not shown).

Figure 7:
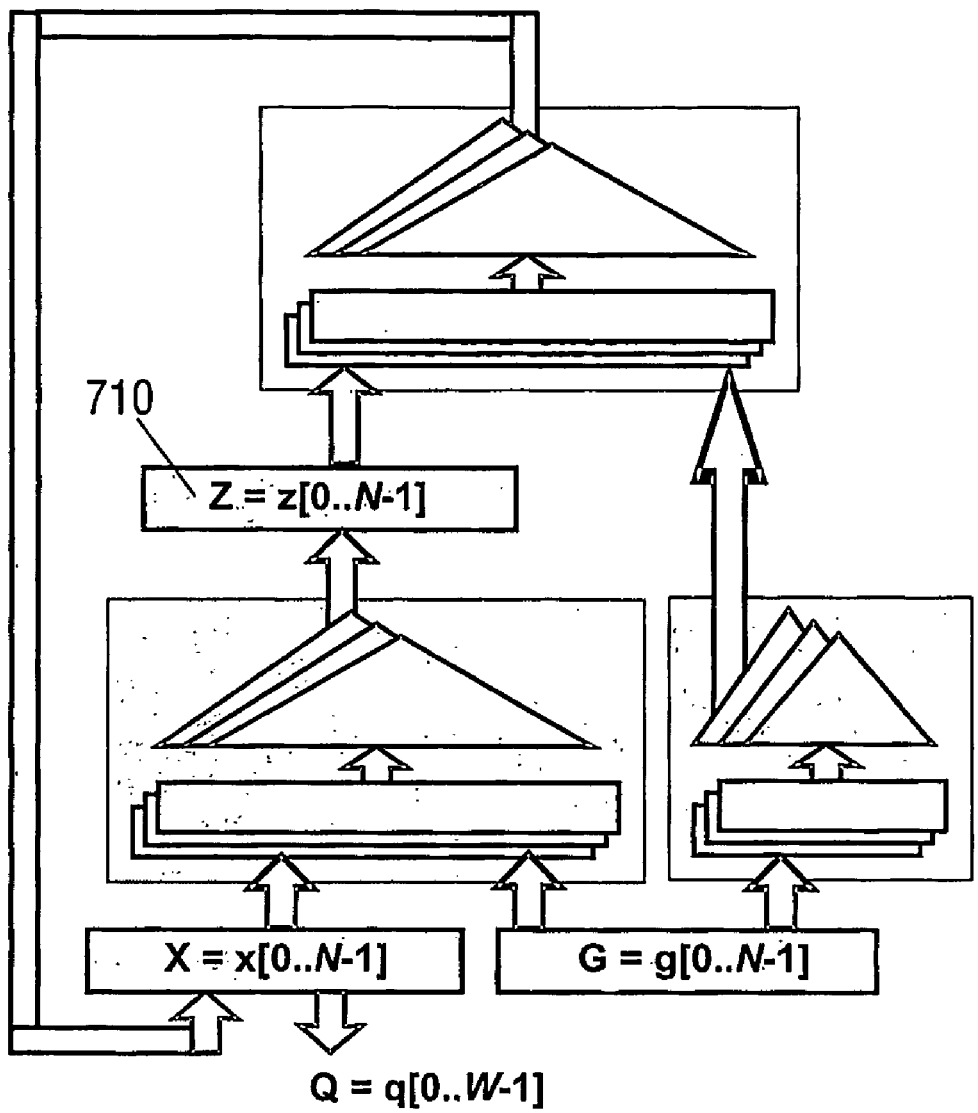
FIG. 7 illustrates a circuit architecture for a N/W-LFSR extended with an intermediate data register.

It is possible to extend the LFSR according to the requirements imposed by the applications in which the LFSR is used. A particularly advantageous extension comprises an intermediate data register, also referred to as a pipeline register, for generating a delayed sequence, as illustrated in FIG. 7. In this context a delayed sequence is a copy of a sequence of symbols, delayed by an arbitrary number of symbols. By initializing the pipeline register said number of symbols is set. The sequence of symbols and the delayed sequence are output interleaved in time, the sequence of symbols during odd clock cycles and the delayed sequence during even clock cycles respectively (or just the opposite). A pipeline vector 710 represents the contents of the pipeline register. The circuit architecture for this extended LFSR remains the same, except that the first set 402 of AND slices 408 and XOR slices 410 is coupled via the pipeline register to the second set 406 of AND slices 416 and XOR slices 418. The pipeline may be implemented as a separate entity as depicted in FIG. 7 or the pipeline register may be comprised in either the first set 402 or in the second set 406. The advantage is that at the cost of merely one additional register in the circuit architecture a delayed sequence can be generated during two clock cycles, while the clock cycle time can be reduced significantly.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A method for accomplishing state transitions in a configurable linear feedback shift register (LFSR) controlled by a clock, the length of the LFSR being represented by N, wherein a state vector represents the state of the LFSR, an output of the LFSR comprising W output symbols, W being at least two, and the output symbols being generated during one clock cycle, a state transition of the LFSR being accomplished during one clock cycle via multiplication of the state vector by a state transition matrix to the power of W (multiple state transition matrix), characterized in that said multiple state transition matrix is decomposed in a first matrix and a second matrix, the first matrix comprising at most N+W+1 different expressions and the second matrix comprising at most N+W+1 different expressions, wherein the elements of the second matrix are defined by:

$$G_{i,j} = \begin{cases} 1, & \text{if } i-j = W \\ g_{i+j-N+1}, & \text{if } (i+j \geq N-1) \wedge (j \geq N-W) \\ 0, & \text{otherwise} \end{cases}$$

and the elements of the first matrix are defined by:

$$P_{i,j} = \begin{cases} 1, & \text{if } i = j \wedge i < N-W \\ p_{i+j-2N+W+1}, & \text{if } i+j \geq 2N-W-1 \\ 0, & \text{otherwise} \end{cases}$$

wherein $p_0 = 1$, $p_i = \sum_{j=0}^{i-1} g_{N-i+j} p_j$ for $0 < i < N$, and $g_0, g_1$ up to and including $g_{N-1}$ represent the configuration symbols which are comprised in the state transition matrix.

2. A method according to claim 1, wherein the expressions of the first matrix are evaluated during a configuration stage of the operation of the LFSR.

3. A configurable linear feedback shift register (LFSR) controlled by a clock, the length of the LFSR being represented by N, a state vector representing the state of the LFSR, the LFSR being arranged to generate an output comprising W output symbols, W being at least two, to generate the output symbols during one clock cycle, the LFSR comprising multiplication means for accomplishing a state transition of the LFSR during one clock cycle via multiplication of the state vector by a state transition matrix to the power of W (multiple state transition matrix), characterized in that said multiple state transition matrix is decomposed in a first matrix and a second matrix, the first matrix comprising at most N+W+1 different expressions and the second matrix comprising at most N+W+1 different expressions, wherein the elements of the second matrix are defined by:

$$G_{i,j} = \begin{cases} 1, & \text{if } i-j = W \\ g_{i+j-N+1}, & \text{if } (i+j \geq N-1) \wedge (j \geq N-W) \\ 0, & \text{otherwise} \end{cases}$$

and the elements of the first matrix are defined by:

$$P_{i,j} = \begin{cases} 1, & \text{if } i = j \wedge i < N-W \\ p_{i+j-2N+W+1}, & \text{if } i+j \geq 2N-W-1 \\ 0, & \text{otherwise} \end{cases}$$

wherein $$p_0 = 1, \; p_i = \sum_{j=0}^{i-1} g_{N-i+j} p_j \text{ for } 0 < i < N,$$

and $g_0, g_1$ up to and including $g_{N-1}$ represent the configuration symbols which are comprised in the state transition matrix.

4. A configurable linear feedback shift register (LFSR) according to claim 3, characterized in that the multiplication means comprises a first set of logical units for performing the multiplication of the state vector by the second matrix and a second set of logical units for performing the multiplication of the state vector by the first matrix.

5. A configurable linear feedback shift register (LFSR) according to claim 4, characterized in that the LFSR comprises a third set of logical units for computing the first matrix.

6. A configurable linear feedback shift register (LFSR) according to claim 5, characterized in that the third set of logical units is arranged to perform the computation of the first matrix during a configuration stage of the operation of the LFSR.

7. A configurable linear feedback shift register (LFSR) according to claim 6, characterized in that the second set of logical units is coupled to the first set of logical units via an intermediate data register.

* * * * *